Figure 1:
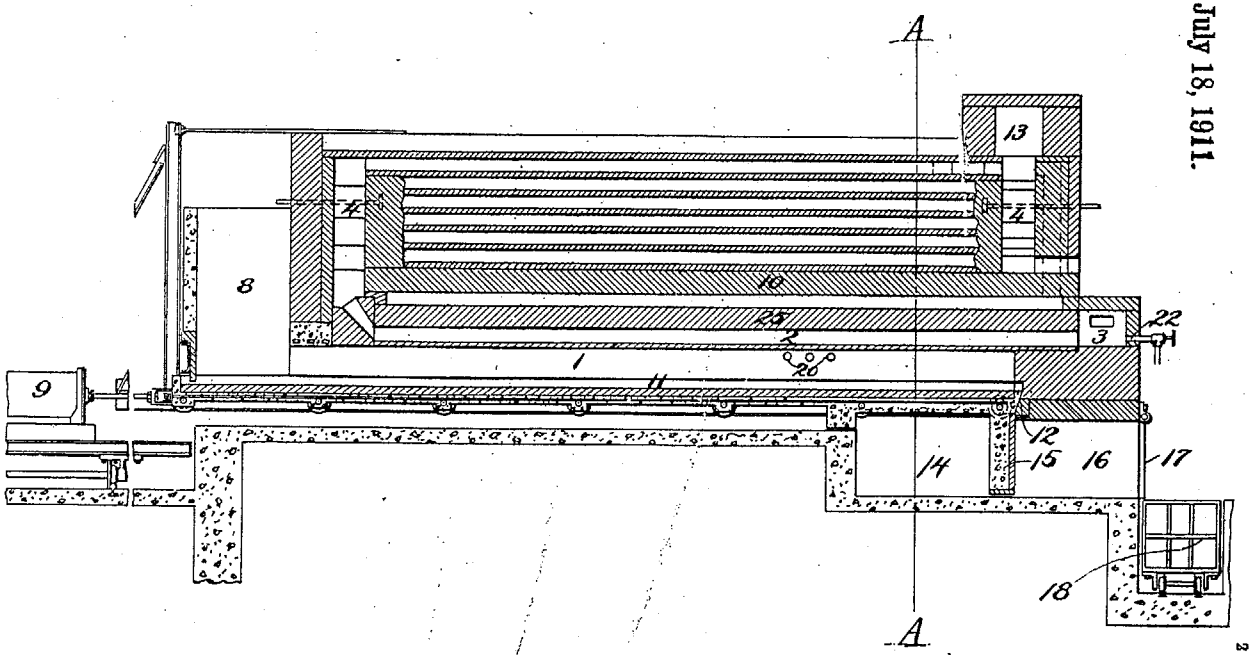

BEST AVAILABLE COPY

L. L. SUMMERS.

COKING FURNACE.

APPLICATION FILED JUNE 14, 1911

2 SHEETS—SHEET 1.

Reissued July 18, 1911.

13,274.

WITNESSES:

C. E. Burnap

Henry A. Parks

INVENTOR

Leland L. Summers

BY

Sheridan, Wilkinson & Hoff

ATTORNEYS

L. L. SUMMERS.

COKING FURNACE.

Reissued July 18, 1911. APPLICATION FILED JUNE 14, 1911

2 SHEETS—SHEET 2.

13,274.

WITNESSES:

C. E. Burnap

Henry A. Parks

INVENTOR

Leland L. Summers

BY

Sheridan, Wilkinson & Scott

ATTORNEYS

UNITED STATES PATENT OFFICE.

LELAND L. SUMMERS, OF CHICAGO, ILLINOIS, ASSIGNOR TO CONTINUOUS PROCESS COKE COMPANY, OF CHICAGO, ILLINOIS, A CORPORATION OF MAINE.

COKING-FURNACE.

13,274. Specification of Reissued Letters Patent. Reissued July 18, 1911.

Original No. 982,879, dated May 9, 1911, Serial No. 533,907. Application for reissue filed June 14, 1911. Serial No. 633,309.

*To all whom it may concern:*

Be it known that I, LELAND L. SUMMERS, a citizen of the United States, residing at Chicago, in the county of Cook and State of Illinois, have invented certain new and useful Improvements in Coking-Furnaces, of which the following is a specification.

The object of my invention is to provide improved coking ovens, and among other features of construction and operation, to provide means for heating the oven or retort from the top, causing the heat to be vertically transmitted to the coal or other carbonaceous material contained in the closed retort, thereby securing coke of a compact formation. In order to accomplish this I construct the top of the retort in the form of an arch, and in this particular design of oven, the hollow ducts from which the oven or retort derives its heat are made lengthwise of the oven, the gas burners, furnace, or other means of supplying heat to the ducts being situated at the discharge end, and heated gases passing through the oven lengthwise and emerging at the charging end.

My invention further relates to means whereby the continuity of these ducts may be preserved, and yet the supporting arch be free to contact and expand under the action of the high temperature, without disturbing the continuity of the ducts and preserving the passage for the gases intact, and separate from the products of distillation which arise from the coal or carbonaceous material contained in the retort. By suspending or attaching the longitudinal ducts to segments of an overhead arch, it is possible to maintain a horizontal roof over the oven of uniform height throughout, and thus preserve a uniform depth to the material being coked and still provide means for permitting the supporting arch to contract and expand. By giving the upper portion a sufficient rise, permitting a vertical or transverse movement under the action of heat, and spacing the longitudinal ducts a slight distance apart, the ducts proper may expand or contract freely, and at the same time the greater portion of the external area of the duct is exposed to a radiating action to the furnace, and thus for a given cross section area of duct a large radiating surface may be provided.

Certain features of the invention described herein are also set forth in another patent granted to me upon the date of this patent upon application Serial No. 415,378, filed in the United States Patent Office February 11, 1908.

Figure 2:
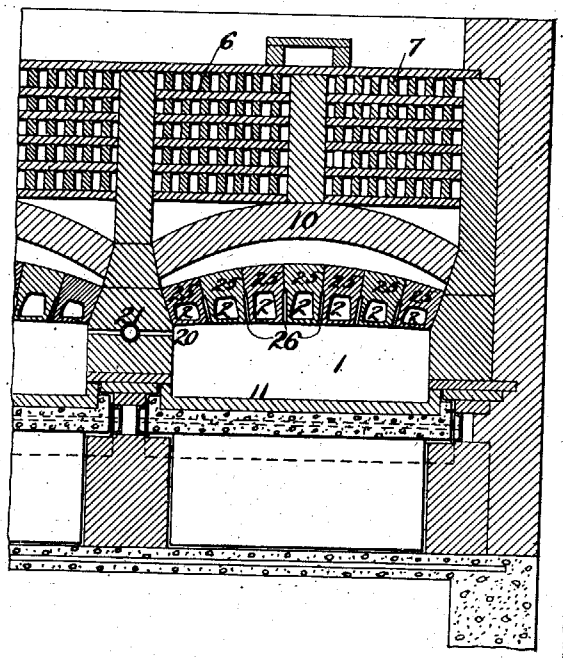
Figure 3:
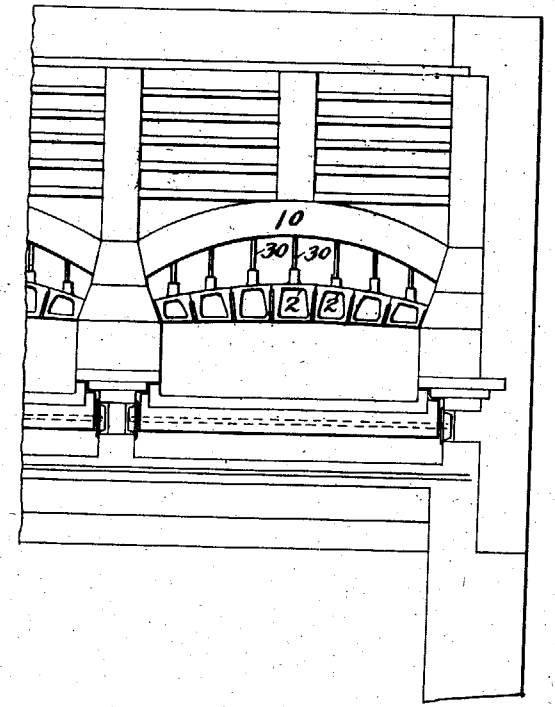

In the drawings,—Figure 1 is a longitudinal section of a retort constructed according to my invention. Fig. 2 is a cross section of the retort along the line A—A shown in Fig. 1. Fig. 3 is a transverse section of a retort with independently supported ducts.

The retort shown in the drawings is preferably of a continuous feeding type, in which coal is supplied to a hopper 8, and by means of a suitable conveyer 11, operated by a plunger 9, the coal is moved through the oven and fed through the retort 1, beneath the longitudinal ducts 2, which are supplied with heat by the burners 3. The products of combustion from the burners 3, after passing through the ducts 2, emerge into the regenerators 6 and 7, which are supported by an independent arch 10 (Fig. 2) through the damped 4, by means of which the products of combustion are alternately caused to pass through for regenerators 6 and 7. After emerging from the regenerator, the products of combustion pass to the flue 13. The carbonaceous material is forced through the retort by means of the conveyer 11, operated by the ram 9, which causes the conveyer 11 to reciprocate backward and forward, and at each forward stroke to receive a charge of coal from the bin 8, and by the forward motion of this material to cause the coke as formed to be forced off of the end of the conveyer at 12, into the pit 14. The conveyer 11 is provided with a downward projecting lug 15 and upon the forward motion of the conveyer, the lug 15 forces the coke which is dropped from over the end 12 of the conveyer into the pit 14, to be forced outward into the space 16 and through the swinging gate 17, into the car or conveyer 18. The gases arising from the distillation of the carbonaceous material are preferably drawn from the retort through the opening 20 and pipe 21 (Fig. 2) to condensers and washers where by-products may be recovered, and the gases are then supplied to the furnace 3 by means of the burner 22. A suitable number of burners 22 may be used, one burner being provided for each duct, or a single burner of adequate size being provided to a furnace and all ducts entering the common furnace.

Longitudinal ducts 2 are a part of or are supported by the arch segments 25. The ducts 2 are attached to the arch segments 25 from the upper side, and each duct is out of contact with the adjacent duct. A clear space 26 opening downward into the oven is provided between each duct and the adjacent duct. By this means the three sides of the duct 2 are permitted to radiate the heat to the retort 1. As the upper portion of the arch segments 25 is of circular or elliptical section, a firm support is given the ducts 2, and as these ducts are used simply for carrying the heated gases, a horizontal surface may be given the roof of the oven by either making each arch segment 25 of irregular section, as shown in the cross section, Fig. 2, or the ducts 2′ may be suitably supported or suspended from the arch 10 (Fig. 3) by means of supports 30. By means of these constructions the ducts which attain the highest temperature in the ovens are the only parts in direct contact with the products of combustion from the furnace 3, and are permitted to expand freely. As no supporting stresses are imposed upon these ducts, the walls may be made thin, and as the main supporting arch does not come in direct contact with the products of combustion, the arch 25 may be made heavy and of materials capable of resisting the mechanical strains. Where desired in the case of high temperature retorts, the ducts 2 may be made out of a very refractory material and may be attached by keying or suspending from the arch 10 (Fig. 3), which may be made of material less refractory than the ducts 2, but having greater strength to resist the pressures imposed by the span of the arch. By this method of constructing the ducts, wide spans may be given to the retort and a large radiating surface maintained from the ducts 2, and adequate provision for expansion made without affecting the mechanical stability of the structure.

Having thus described my invention, I claim:

1. A coking retort from which air is excluded, an overhead arch, and heating ducts formed in the arch and extending at right angles to the span of the arch.

2. In a coking retort, an arch located over the retort, carrying heating ducts extending parallel to the length of the retort.

3. In a coking retort having an overhead arch hollow ducts located in the arch forming passages for heated gases, said passages extending lengthwise of the retort.

4. A coking retort having heating ducts located over the furnace and extending lengthwise of the furnace, means for applying heated gases to the ducts at the discharge end of the furnace and causing them to travel lengthwise of the furnace toward the charging end.

5. In a coking retort having an overhead arch containing heating ducts, means for suspending the heating ducts from the arch, permitting the ducts to expand and contract independently of the arch.

6. In a coking retort having an overhead arch carrying heating ducts, means of attaching the heating ducts to the arch from one side and permitting radiation to the retort from the other three sides.

7. In a coking retort an overhead arch composed of ducts of irregular section for heating the retort, said ducts extending lengthwise of the retort.

8. In a coking retort an overhead arch of refractory material having heating ducts arranged to form a horizontal roof to the retort.

9. A coking retort having the top inclosed by horizontal heating ducts extending lengthwise of the retort.

10. A coking retort having heating ducts forming a horizontal roof to the retort, and means for supporting the heating ducts from an arch.

11. In a retort, a roof comprising a plurality of transverse arches, and flue sections depending from the members of which said arches are composed, said flue sections being provided with registering longitudinal flue openings.

12. In a retort, a roof comprising a plurality of transverse arches, and flue sections depending from the members of which said arches are composed, said flue sections being spaced apart transversely and provided with registering longitudinal flue openings.

13. In a retort, a roof comprising a plurality of transverse arches, each arch member comprising an upper thrust section contacting with the adjacent members, and a lower flue section integral with said thrust section, said flue sections being spaced apart transversely and provided with registering longitudinal flue openings.

14. In a retort having an arched roof, an arch member having an upper thrust section, and a lower flue section integral therewith, the sides of said flue section lying inside of the planes of the sides of said thrust section for the purpose of leaving clearance spaces at the sides of the flue section when a plurality of said arch members are assembled.

15. In a retort, a roof comprising a plurality of transverse arches, flue sections depending from the members of which said arches are composed, said flue sections being spaced apart transversely and provided with registering longitudinal flue openings, means for conveying material through said retort from end to end, and a source of heat communicating with said flues at the discharge end of said retort.

16. In a retort, a longitudinally reciprocable floor, means for supplying material thereto at the charging end of said retort, means for restraining said material against movement except toward the discharge end of said retort, a discharge pit beneath said retort at the discharge end thereof, and a projection extending downwardly from the discharge end of said floor into said pit.

In testimony whereof, I have subscribed my name.

LELAND L. SUMMERS.

Witnesses:
WALTER A. SCOTT,
CHARLES E. BURNAP.